July 8, 1952     E. T. PEDRANTI ET AL     2,602,391

FLAVORING SPIKE

Filed April 27, 1950

Eugene T. Pedranti
Isabel M. Pedranti
INVENTORS

Patented July 8, 1952

2,602,391

UNITED STATES PATENT OFFICE 2,602,391

FLAVORING SPIKE

Eugene T. Pedranti and Isabel M. Pedranti, Petaluma, Calif.; said Isabel M. Pedranti assignor to said Eugene T. Pedranti Application April 27, 1950, Serial No. 158,444

2 Claims. (Cl. 99—345)

This invention comprises novel and useful improvements in cooking devices, and more particularly pertains to a flavoring device for use in flavoring articles while cooking.

An important object of this invention is to provide a flavoring spike which will form a plurality of wells in the central portion of the cooking article, and gradually introduce flavoring fluids to those wells thereby increasing the impregnation of the cooking article by the flavoring fluids.

Another object of this invention is to provide a flavoring spike which can be positioned in any angular position on the cooking article.

A further object of this invention is to provide a flavoring spike, in accordance with the foregoing objects, which will volatilize a portion of the flavoring fluids prior to the introduction of the flavoring fluids to the cooking article, and then convey the volatilized flavoring fluids into the central portion of the cooking article, in order to more thoroughly impregnate the latter.

An important feature of this invention resides in the provision of an elongated spike having a longitudinal bore and transverse bores communicating the longitudinal bore with the external surface of the spike, and peripheral recesses on the spike communicating with the transverse bore so that the flavoring fluids will gradually flow out of the spike into the wells formed by the recesses.

Another feature of this invention resides in the provision of a flavoring spike, in accordance with the foregoing features, which flavoring spike has a casing mounted on the upper end thereof in communication with said bore, the bottom wall of which casing terminates below the upper end of the flavoring spike so as to provide a receptacle for flavoring fluids which will be volatilized as the casing is heating during the cooking process.

These, together with various ancillary objects and features, are attained by this device, a preferred embodiment of which has been illustrated by way of example only in the accompanying drawings, wherein.

Figure 1:
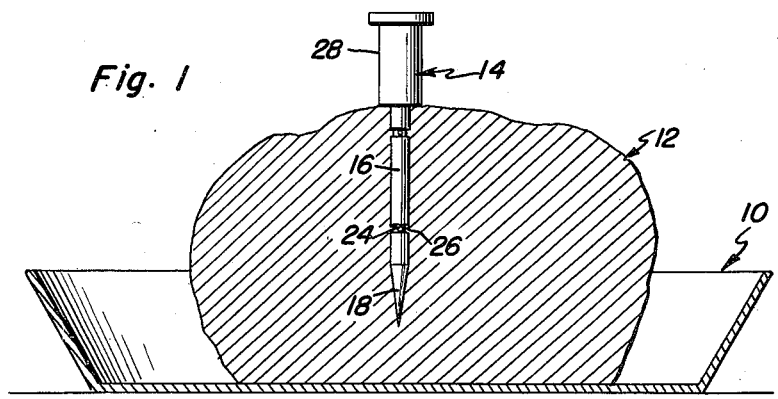
Figure 1 is a vertical sectional view of a receptacle with an article positioned in the receptacle, and a flavoring spike inserted in the article.
Figure 2:
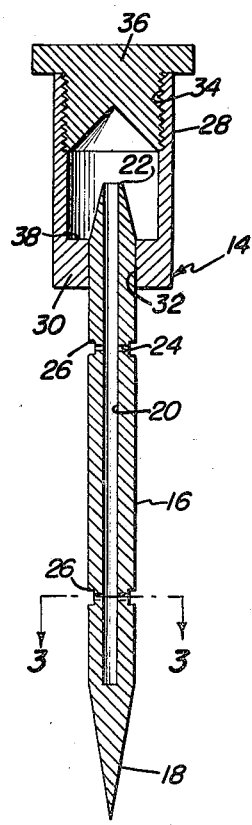
Figure 2 is a longitudinal sectional view of the flavoring spike.
Figure 3:
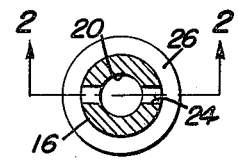
Figure 3 is a transverse sectional view of the flavoring spike, taken substantially on the plane of the line 3—3 of Figure 2.

Referring now more specifically to the accompanying drawings, wherein like numerals designate similar parts throughout the various views, it will be seen that there is provided a conventional receptacle indicated generally by the numeral 10 which receives an edible article, such as a ham or the like 12 during the cooking of the article.

It is a main desideratum of this invention to provide a device for flavoring the article 12, during the cooking thereof, in such a manner that the entire article can be thoroughly and evenly impregnated with the flavoring fluids. For this purpose there is provided a flavoring spike indicated generally by the numeral 14, which spike consists of an elongated member 16, preferably annular in cross-section, and having a conical tip 18, to permit the easy insertion of the spike into the article 12. The member 16 is provided with a longitudinal extending bore 20 which opens at the upper end 22, and a plurality of transversely extending bores 24 which communicate the longitudinal bore 20 with the external surface of the member 16, at various longitudinally spaced points on the member.

In order to prevent the bores 24 from being clogged by evaporated flavoring constituents, the member 16 is provided with a plurality of peripheral recesses 26 which communicate with the outer ends of the transverse bores 24, and provide a plurality of longitudinally spaced wells within the article 12, after the member 16 is inserted therein. In this manner a predetermined quantity of flavoring material is permitted to flow through the apertures 24, the evaporation of the flavoring material then occurring in the wells formed by the recesses 26.

It is also intended that this flavoring spike 14 be so constructed that it may be positioned in any angular position in the article 12, and for this purpose there is provided a casing 28 having a bottom wall 30 and a central aperture 32 extending through the bottom wall. The upper end of the member 16 being received in the aperture so that the longitudinal bore 20 is in communication with the casing. The upper end of the casing 28 is internally threaded as at 34 so as to screw-threadedly receive a cover member 36.

The flavoring spike 14 may thus be positioned in the article 12 in any desired position, the cover member 36 preventing the escape of the flavoring fluids contained within the casing 28.

It has been found desirable to introduce only the volatile constituents of the flavoring fluids into the central portion of the article 12, and for this purpose the upper end 22 of the spike 16 terminates above the inner surface 38 of the bottom wall 30, so as to provide a receptacle for the flavoring fluids during the cooking process. Obviously, as the article 12 is cooked, the casing 28 will be heated, and the flavoring fluids contained therein will be volatilized, the volatile constituents being conducted by the longitudinal bore 20, and transverse bores 24 into the central portion of the article 12. In this manner there will be no sedimentary deposits left on the interior of the article 12 when the flavoring spike 14 is removed therefrom, since the sedimentary deposits would impair the flavoring of the article during the cooking thereof, and are also undesirable for consumption.

It may be noted at this time that because the upper end of the spike 16 terminates above the inner surface 38 of the bottom wall 30 of the casing, the flavoring spike 14 may be inserted in any angular position into the body 12, and yet provide a flavoring fluid receiving receptacle in which the flavoring fluid can rest during the cooking of the article, without flowing through the longitudinal bore 20.

From the foregoing, it is thought that the operation and construction of the device will be readily understood, and further discussion is, therefore, believed to be unnecessary. However, since numerous modifications will readily occur to those skilled in the art after a consideration of the foregoing specification and accompanying drawings, it is not intended to limit the invention to that shown and described, but all suitable modifications may be resorted to falling within the scope of the appended claims.

Having described the invention, what is claimed as new is:

1. A flavoring device comprising a casing adapted to receive a flavoring fluid and having a bottom wall and a detachable cover therefor, an elongated member having an axial bore therein and opening at one end thereof, said member extending into said casing and terminating above said bottom wall, said member having a plurality of longitudinally spaced transversely extending bores communicating with said longitudinal bore and opening at the sides of said member.

2. A flavoring device comprising a casing adapted to receive a flavoring fluid and having a bottom wall and a detachable cover therefor, an elongated member having an axial bore therein and opening at one end thereof, said member extending into said casing and terminating above said bottom wall, said member having a plurality of longitudinally spaced transversely extending bores communicating with said longitudinal bore and opening at the sides of said member, said member having longitudinally spaced recesses in the outer face thereof, said recesses each communicating with one of said transverse bores.

EUGENE T. PEDRANTI.
ISABEL M. PEDRANTI.

REFERENCES CITED

The following references are of record in the file of this patent:

UNITED STATES PATENTS

| Number | Name | Date |
|---|---|---|
| 1,661,595 | Bowen | Mar. 6, 1928 |
| 1,737,069 | Barber | Nov. 26, 1929 |
| 2,075,407 | Schwartzman | Mar. 30, 1937 |
| 2,116,591 | Barber | May 10, 1938 |
| 2,212,477 | Mayer | Aug. 20, 1940 |
| 2,473,191 | Bettencourt | June 14, 1949 |